(12) United States Patent
Hanaoka

(10) Patent No.: US 10,894,563 B2
(45) Date of Patent: Jan. 19, 2021

(54) VEHICLE FRAMEWORK STRUCTURE

(71) Applicant: TOYOTA JIDOSHA KABUSHIKI KAISHA, Aichi-ken (JP)

(72) Inventor: Yusuke Hanaoka, Nisshin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 85 days.

(21) Appl. No.: 16/264,683

(22) Filed: Feb. 1, 2019

(65) Prior Publication Data
US 2019/0241217 A1 Aug. 8, 2019

(30) Foreign Application Priority Data

Feb. 5, 2018 (JP) .................. 2018-018698

(51) Int. Cl.
*B62D 25/02* (2006.01)
*B62D 25/20* (2006.01)
*B62D 27/02* (2006.01)
*B62D 27/06* (2006.01)
*B62D 25/04* (2006.01)

(52) U.S. Cl.
CPC ....... *B62D 25/025* (2013.01); *B62D 25/2036* (2013.01); *B62D 27/02* (2013.01); *B62D 27/026* (2013.01); *B62D 27/06* (2013.01); *B62D 25/04* (2013.01)

(58) Field of Classification Search
CPC .. B62D 25/025; B62D 25/2036; B62D 25/04; B62D 27/026; B62D 27/02; B62D 27/06

USPC ..................................................... 296/203
See application file for complete search history.

(56) References Cited

U.S. PATENT DOCUMENTS

| 6,053,564 | A | * | 4/2000 | Kamata | ............... | B62D 21/152 |
| | | | | | | 296/187.09 |
| 2012/0256448 | A1 | | 10/2012 | Yasui et al. | | |
| 2016/0251034 | A1 | * | 9/2016 | Kumagai | ............. | B62D 21/155 |
| | | | | | | 296/187.08 |
| 2016/0257344 | A1 | * | 9/2016 | Hasegawa | ............. | B62D 25/04 |

FOREIGN PATENT DOCUMENTS

| JP | 2012-218538 A | 11/2012 |
| JP | 2015-113061 A | 6/2015 |

* cited by examiner

*Primary Examiner* — Joseph D. Pape
*Assistant Examiner* — Dana D Ivey
(74) *Attorney, Agent, or Firm* — Hauptman Ham, LLP

(57) ABSTRACT

A vehicle framework structure includes: a framework body portion extending in a vehicle front-rear direction in a vehicle end portion in a vehicle width direction, the framework body portion forming a closed section by an inner panel constituting an inner part of the framework body portion in the vehicle width direction and an outer panel constituting an outer part of the framework body portion in the vehicle width direction; and a reinforcing member placed inside the closed section of the framework body portion, the reinforcing member including a body portion inclined from the vehicle front-rear direction and provided over the inner panel and the outer panel, and a flange portion extending from an outer peripheral edge of the body portion and joined to the inner panel and the outer panel.

8 Claims, 11 Drawing Sheets

VEHICLE FRAMEWORK STRUCTURE

INCORPORATION BY REFERENCE

The disclosure of Japanese Patent Application No. 2018-018698 filed on Feb. 5, 2018 including the specification, drawings and abstract is incorporated herein by reference in its entirety.

BACKGROUND

1. Technical Field

The disclosure relates to a vehicle framework structure.

2. Description of Related Art

Japanese Unexamined Patent Application Publication No. 2012-218538 (JP 2012-218538 A) describes a structure in which a bulk head (a reinforcing member) is welded to an inner side of a side sill inner (a rocker inner panel) constituting a side sill (a rocker). At the time of a narrow offset collision, the bulk head supports the side sill inner from a vehicle-cabin side, so that sectional collapse of the side sill inner is restrained.

SUMMARY

In the meantime, there has been recently known a vehicle in which a vehicle framework member such as a rocker is formed by use of high tensile steel or super high tensile steel having a high tensile strength. In such a vehicle, it is possible to thin a steel plate while its strength is maintained, thereby making it possible to achieve a weight reduction. Meanwhile, sectional collapse, or fluctuations of the rocker in a manner that the section of the rocker gets distorted, easily occurs due to the thinning of the steel plate, and there is room for improvement in the viewpoint of securing noise and vibration (NV) performance.

The disclosure provides a vehicle framework structure that can secure NV performance while a weight reduction is achieved.

An aspect of the disclosure provides a vehicle framework structure including: a framework body portion extending in a vehicle front-rear direction in a vehicle end portion in a vehicle width direction, the framework body portion forming a closed section by an inner panel constituting an inner part of the framework body portion in the vehicle width direction and an outer panel constituting an outer part of the framework body portion in the vehicle width direction; and a reinforcing member placed inside the closed section of the framework body portion, the reinforcing member including a body portion inclined from the vehicle front-rear direction and provided over the inner panel and the outer panel, and a flange portion extending from an outer peripheral edge of the body portion and joined to the inner panel and the outer panel.

In the vehicle framework structure according to the above aspect, the framework body portion is provided in the vehicle end portion in the vehicle width direction so as to extend in the vehicle front-rear direction, and the framework body portion is configured such that its closed section is formed by the inner panel provided on the inner side in the vehicle width direction and the outer panel provided on the outer side in the vehicle width direction. Further, the reinforcing member is placed inside the closed section of the framework body portion, and the reinforcing member includes the body portion provided over the inner panel and the outer panel, and the flange portion extending from the outer peripheral edge of the body portion and joined to the inner panel and the outer panel. Thus, the rigidity of the framework body portion can be increased by the reinforcing member, thereby making it possible to restrain sectional collapse of the framework body portion due to booming noise of an engine, road noise, and the like.

Further, the body portion of the reinforcing member is inclined from the vehicle front-rear direction. That is, the body portion is placed diagonally to the extending direction of the framework body portion. This makes it possible to restrain sectional collapse of the framework body portion in a wide range, in comparison with a configuration in which the reinforcing member is placed in a direction perpendicular to the extending direction of the framework body portion. As a result, the number of reinforcing members can be reduced, thereby making it possible to restrain an increase in the weight of the vehicle.

As described above, with the vehicle framework structure according to the above aspect, it is possible to yield such an excellent effect that NV performance can be secured while a weight reduction is achieved.

In the above aspect, the framework body portion may be a rocker extending in the vehicle front-rear direction in a vehicle lower portion.

In the above configuration, the reinforcing member is placed inside the closed section of the rocker, thereby making it possible to effectively restrain sectional collapse of the rocker.

Further, with the above configuration, it is possible to yield such an excellent effect that a decrease in NV performance caused due to vibration from the vehicle lower portion side can be restrained.

In the above aspect, one end of a floor panel in the vehicle width direction may be joined to the inner panel from a lower side in a vehicle up-down direction, the body portion of the reinforcing member may be placed so as to be inclined outwardly in the vehicle width direction or inwardly in the vehicle width direction from a front side to a rear side in the vehicle front-rear direction in a vehicle plan view, and a section of the body portion viewed from the vehicle width direction may extend along the vehicle up-down direction.

In the above configuration, one end of the floor panel in the vehicle width direction is joined to the inner panel of the rocker. Here, since the floor panel is joined to the inner panel from the lower side in the vehicle up-down direction, vibration in the vehicle up-down direction is easily input into the floor panel from the rocker in particular. In the meantime, the body portion of the reinforcing member is placed so as to be inclined outwardly in the vehicle width direction or inwardly in the vehicle width direction from the front side to the rear side in the vehicle front-rear direction in a plan view. Further, the section of the body portion viewed from the vehicle width direction extends along the vehicle up-down direction. This makes it possible to effectively restrain sectional collapse of the rocker in the up-down direction.

Further, with the above configuration, it is possible to yield such an excellent effect that vibration of the floor panel can be effectively restrained in the configuration where the floor panel is joined to the rocker from the lower side in the vehicle up-down direction.

In the above aspect, the flange portion may include an inner flange placed on an inner side of the body portion in the vehicle width direction, and an outer flange placed on an outer side of the body portion in the vehicle width direction.

Either one of the inner flange and the outer flange may form an obtuse angle with respect to the body portion and is joined to the framework body portion by welding, and the other one of the inner flange and the outer flange may form an acute angle with respect to the body portion and is joined to the framework body portion mechanically with an adhesive or a fastening member.

In the above configuration, the flange portion that forms an obtuse angle with respect to the body portion is joined to the framework body portion by welding, and the flange portion that forms an acute angle with respect to the body portion is mechanically joined to the framework body portion with an adhesive or a fastening member. Hereby, for example, in a case where the inner flange forms an obtuse angle with respect to the body portion and the outer flange forms an acute angle with respect to the body portion, the inner flange is first joined to the inner panel of the framework body portion by welding. At this time, since the inner flange forms an obtuse angle with respect to the body portion, it is possible to secure a wide working space, so that welding can be performed easily. In the meantime, at the time when the outer flange is joined to the outer panel of the framework body portion, they can be joined by a mechanical method using an adhesive, a fastening member, or the like that does not require a working space.

Further, with the above configuration, it is possible to yield such an excellent effect that working efficiency at the time of joining the reinforcing member to the framework body portion can be improved in comparison with a case where the inner flange and the outer flange are both joined to the framework body portion by welding.

In the above aspect, one end of a floor panel in the vehicle width direction may be joined to the inner panel from an inner side in the vehicle width direction. The body portion of the reinforcing member may be placed so as to be inclined upward in a vehicle up-down direction or downward in the vehicle up-down direction from a front side to a rear side in the vehicle front-rear direction in a vehicle side view. A section of the body portion viewed from the vehicle up-down direction may extend along the vehicle width direction.

In the above configuration, one end of the floor panel in the vehicle width direction is joined to the inner panel of the rocker. Here, since the floor panel is joined to the inner panel from the inner side in the vehicle width direction, vibration in the vehicle width direction is easily input into the floor panel from the rocker in particular. In the meantime, the body portion of the reinforcing member is placed so as to be inclined upward in the vehicle up-down direction or downward in the vehicle up-down direction from the front side to the rear side in the vehicle front-rear direction in a side view. Further, the section of the body portion viewed from the vehicle up-down direction extends along the vehicle width direction. This makes it possible to effectively restrain sectional collapse of the rocker in the vehicle width direction.

With the above configuration, it is possible to yield such an excellent effect that vibration of the floor panel can be effectively restrained in the configuration where the floor panel is joined to the rocker from the inner side in the vehicle width direction.

In the above aspect, the reinforcing member may be placed at least between a front pillar and a center pillar or between the center pillar and a rear pillar.

With the above configuration, it is possible to improve the rigidity between pillars where vibration easily increases in particular.

That is, with the above configuration, it is possible to yield such an excellent effect that vibration between pillars can be restrained.

In the above aspect, the framework body portion may be a roof side rail provided in a vehicle upper portion so as to extend in the vehicle front-rear direction.

In the above configuration, when the reinforcing member is placed inside the closed section of the roof side rail, it is possible to effectively restrain sectional collapse of the roof side rail. Further, with the above configuration, it is possible to yield such an excellent effect that a decrease in NV performance caused due to vibration from the vehicle upper portion side can be restrained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

The following describes a vehicle framework structure according to the first embodiment with reference to the drawings. Note that an arrow FR shown appropriately in each figure indicates the front side in the vehicle front-rear direction, an arrow UP indicates the upper side in the vehicle up-down direction, and an arrow LH indicates the left side in the vehicle right-left direction. Hereinafter, in a case where a description is made by use of merely directions of front and rear, up and down, and right and left, they indicate the front and rear sides in the vehicle front-rear direction, the up and down sides in the vehicle up-down direction, and the right and left sides when a vehicle faces its traveling direction, respectively, unless otherwise specified.

Figure 1:
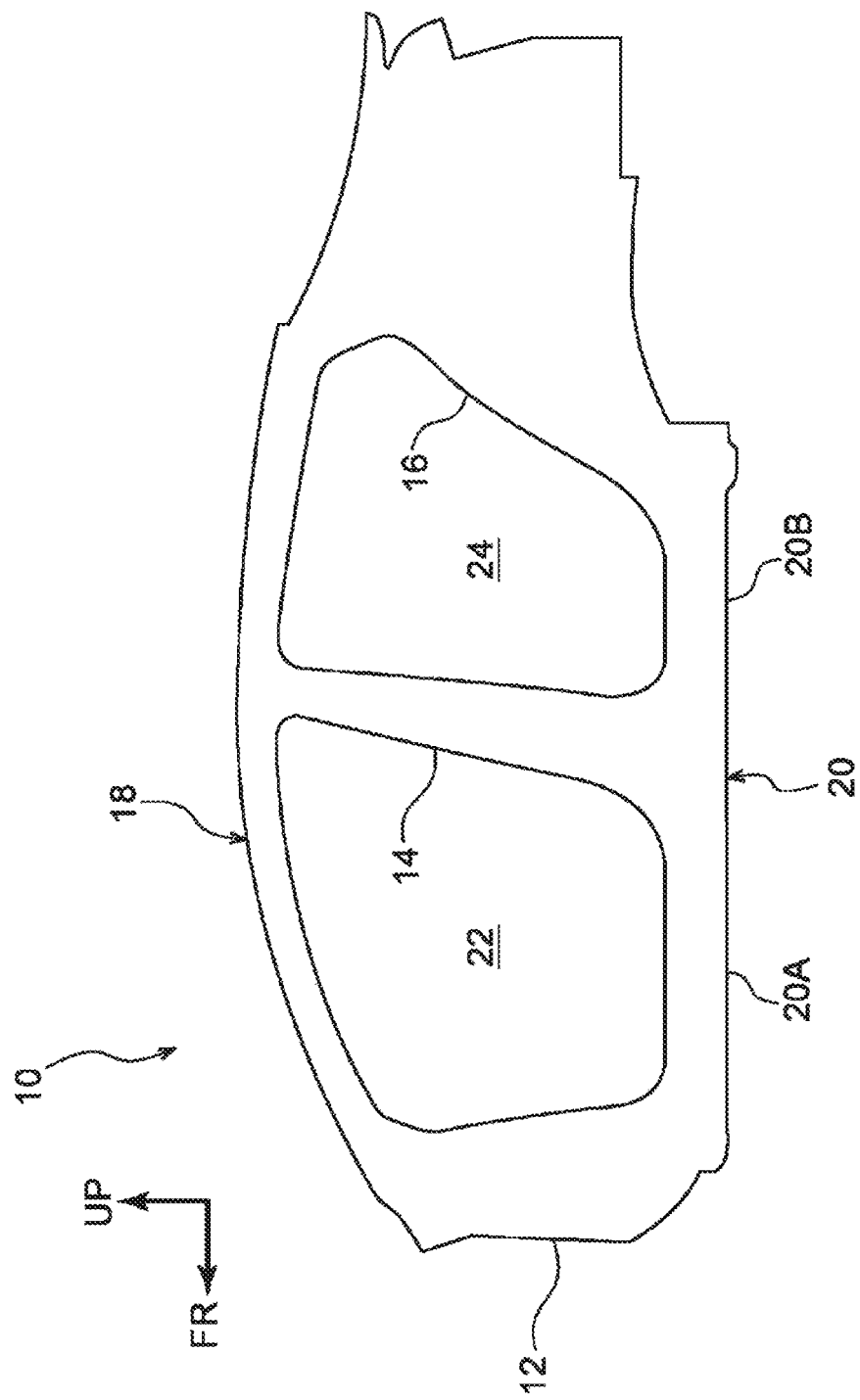
FIG. 1 is a side view illustrating an essential part of a vehicle equipped with a vehicle framework structure according to a first embodiment.

As illustrated in FIG. 1, a vehicle 10 to which the vehicle framework structure of the present embodiment is applied includes a front pillar 12, a center pillar 14, and a rear pillar 16. Note that, in FIG. 1, only an essential part of the vehicle 10 is illustrated for convenience of the description, and a vehicle front structure such as a front side member, a side door, and so on are not illustrated herein.

The front pillar 12 is a framework member provided in the front side of the vehicle in the vehicle front-rear direction so as to extend in the vehicle up-down direction, and a pair of the front pillars 12 is provided such that one of the front pillars 12 is provided on a first side in the vehicle width direction and the other one of them is provided on a second side in the vehicle width direction. Further, the center pillar 14 is provided behind the front pillar 12 in the vehicle front-rear direction. The center pillar 14 is a framework member provided in a central part of the vehicle in the vehicle front-rear direction so as to extend in the vehicle up-down direction, and a pair of the center pillars 14 is provided such that one of the center pillars 14 is provided on the first side in the vehicle width direction and the other one of them is provided on the second side in the vehicle width direction. Further, the rear pillar 16 is provided behind the center pillar 14 in the vehicle front-rear direction. The rear pillar 16 is a framework member provided in the rear side of the vehicle in the vehicle front-rear direction so as to extend in the vehicle up-down direction, and a pair of the rear pillars 16 is provided such that one of the rear pillars 16 is provided on the first side in the vehicle width direction and the other one of them is provided on the second side in the vehicle width direction.

A vehicle upper portion is provided with a roof side rail 18 extending in the vehicle front-rear direction. The roof side rail 18 is a framework member connected to an upper end of the front pillar 12, an upper end of the center pillar 14, and an upper end of the rear pillar 16, and a pair of the roof side rails 18 is provided such that one of the roof side rails 18 is provided on the first side in the vehicle width direction and the other one of them is provided on the second side in the vehicle width direction.

A vehicle lower portion is provided with a rocker 20 extending in the vehicle front-rear direction as a framework body portion. The rocker 20 is connected to a lower end of the front pillar 12, a lower end of the center pillar 14, and a lower end of the rear pillar 16, and a pair of the rockers 20 is provided such that one of the rockers 20 is provided on the first side in the vehicle width direction and the other one of them is provided on the second side in the vehicle width direction. On this account, a front-side opening 22 is formed by the front pillar 12, the center pillar 14, the roof side rail 18, and the rocker 20, and the front-side opening 22 is closed by a front side door (not shown). Further, a rear-side opening 24 is formed by the center pillar 14, the rear pillar 16, the roof side rail 18, and the rocker 20, and the rear-side opening 24 is closed by a rear side door (not shown).

Here, in the present embodiment, a bulk head 30 (see FIG. 2) serving as a reinforcing member is provided in each of a part 20A of the rocker 20 between the front pillar 12 and the center pillar 14 and a part 20B of the rocker 20 between the center pillar 14 and the rear pillar 16. The following describes detailed configurations of the rocker 20 and the bulk head 30 with reference to FIGS. 2 to 5. Note that the rockers 20 are configured to be bilaterally symmetric, so that the following description deals with only the rocker 20 provided on the left side of the vehicle and the description of the rocker on the right side of the vehicle is omitted. Further, in the following description, the part 20A between the front pillar 12 and the center pillar 14 is described by illustration, but the part 20B of the rocker 20 between the center pillar 14 and the rear pillar 16 also has a configuration similar to that of the part 20A.

Figure 2:
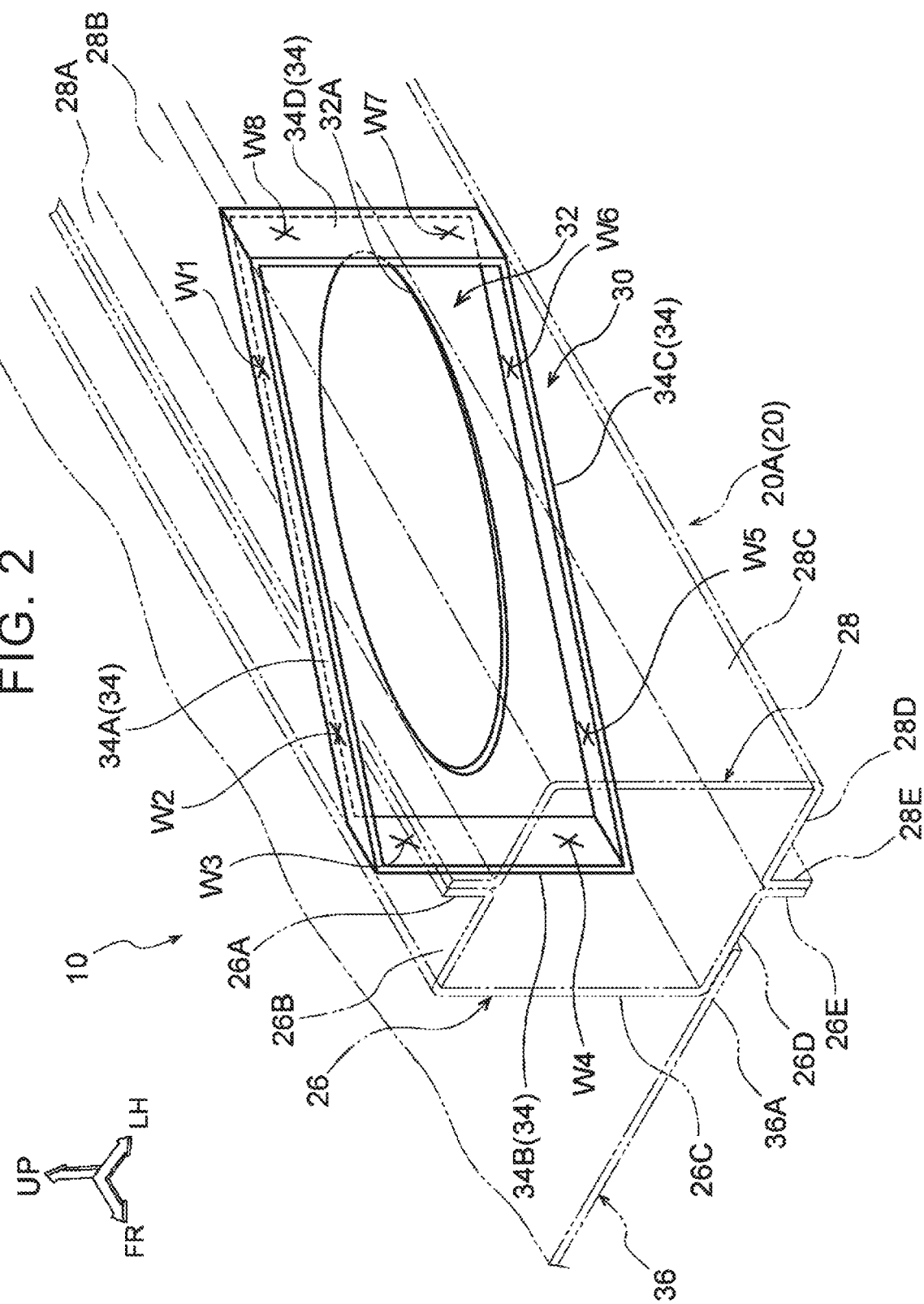
FIG. 2 is a perspective view of a rocker and a bulk head according to the first embodiment when they are viewed from the diagonally upper front side.
Figure 3:
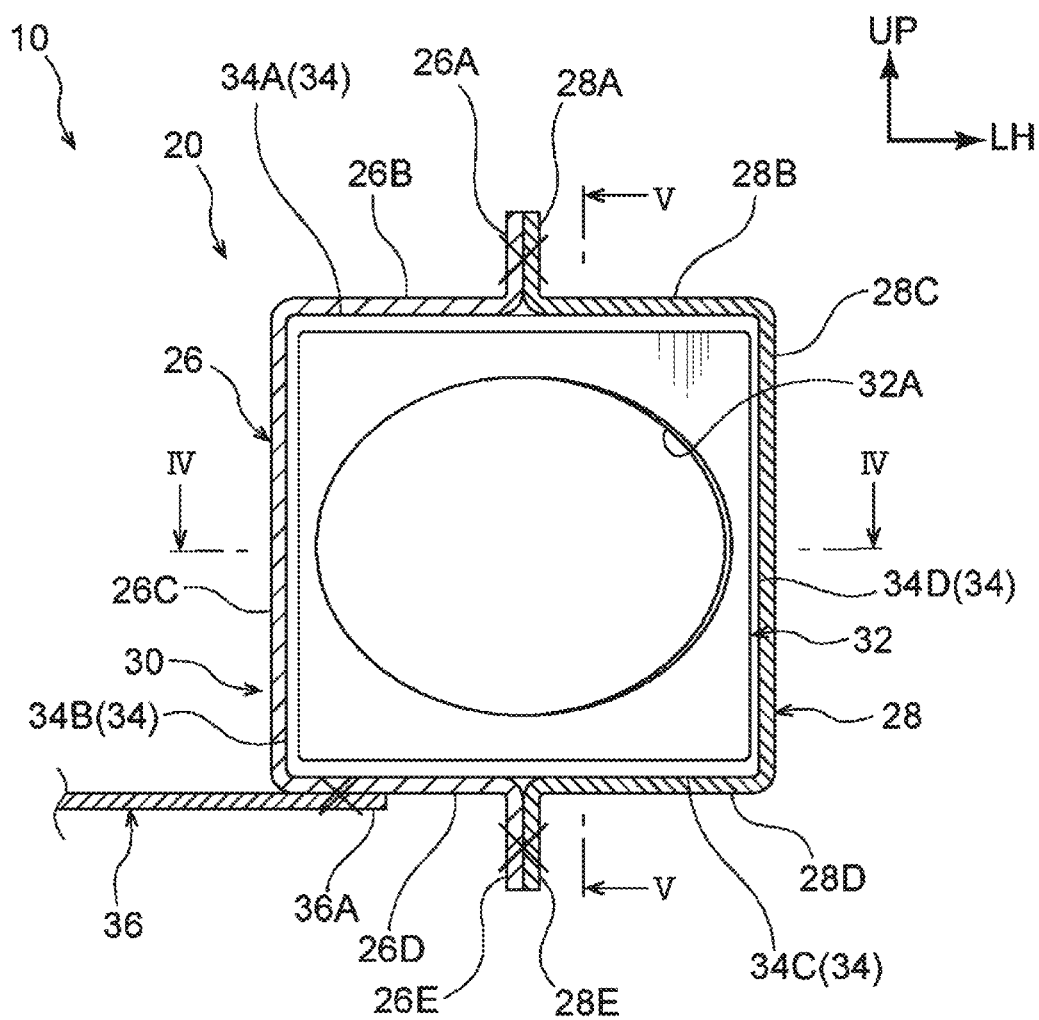
FIG. 3 is a sectional view of the rocker according to the first embodiment when it is viewed from the front side.

As illustrated in FIGS. 2 and 3, the rocker 20 includes a rocker inner panel 26 placed on the inner side in the vehicle width direction (on the right side in the vehicle right-left direction in the figure), and a rocker outer panel 28 placed on the outer side in the vehicle width direction (on the left side in the vehicle right-left direction in the figure), so as to constitute a closed section. Further, the bulk head 30 is placed inside the closed section of the rocker 20. Details of the bulk head 30 will be described later.

The rocker inner panel 26 is formed to have a generally hat-shaped section that is opened toward the left side in the vehicle right-left direction, and a rocker-inner-side upper flange 26A extending in the vehicle up-down direction is provided in an upper end of the rocker inner panel 26. Further, a rocker-inner-side upper wall portion 26B extends from a lower end of the rocker-inner-side upper flange 26A toward the right side in the vehicle right-left direction, and a rocker-inner-side vertical wall portion 26C extends downward in the vehicle up-down direction from a right end of the rocker-inner-side upper wall portion 26B in the vehicle right-left direction. Further, a rocker-inner-side lower wall portion 26D extends from a lower end of the rocker-inner-side vertical wall portion 26C toward the left side in the vehicle right-left direction, and a rocker-inner-side lower flange 26E extends downward in the vehicle up-down direction from a left end of the rocker-inner-side lower wall portion 26D in the vehicle right-left direction.

In the meantime, the rocker outer panel 28 is formed to have a generally hat-shaped section that is opened toward the right side in the vehicle right-left direction, and a rocker-outer-side upper flange 28A extending in the vehicle up-down direction is provided in an upper end of the rocker outer panel 28. In a state where the rocker-outer-side upper flange 28A and the rocker-inner-side upper flange 26A of the rocker inner panel 26 overlap with each other, they are joined to each other by spot welding or the like.

A rocker-outer-side upper wall portion 28B extends from a lower end of the rocker-outer-side upper flange 28A toward the left side in the vehicle right-left direction, and a rocker-outer-side vertical wall portion 28C extends downward in the vehicle up-down direction from a left end of the rocker-outer-side upper wall portion 28B in the vehicle right-left direction. Further, a rocker-outer-side lower wall portion 28D extends from a lower end of the rocker-outer-side vertical wall portion 28C toward the right side in the vehicle right-left direction, and a rocker-outer-side lower flange 28E extends downward in the vehicle up-down direction from a right end of the rocker-outer-side lower wall portion 28D in the vehicle right-left direction. In a state where the rocker-outer-side lower flange 28E and the rocker-inner-side lower flange 26E of the rocker inner panel 26 overlap with each other, they are joined to each other by spot welding or the like. Thus, the closed section is formed by the rocker inner panel 26 and the rocker outer panel 28.

Here, a floor panel 36 is joined to the rocker inner panel 26. The floor panel 36 is a plate-shaped member constituting a floor part of the vehicle and extends in the vehicle width direction and in the vehicle front-rear direction. In a state where a left end 36A of the floor panel 36 in the vehicle right-left direction (one end of the floor panel 36 in the vehicle width direction) overlaps with the rocker-inner-side lower wall portion 26D of the rocker inner panel 26 from the lower side in the vehicle up-down direction, the left end 36A and the rocker-inner-side lower wall portion 26D are joined to each other by spot welding or the like.

Figure 4:
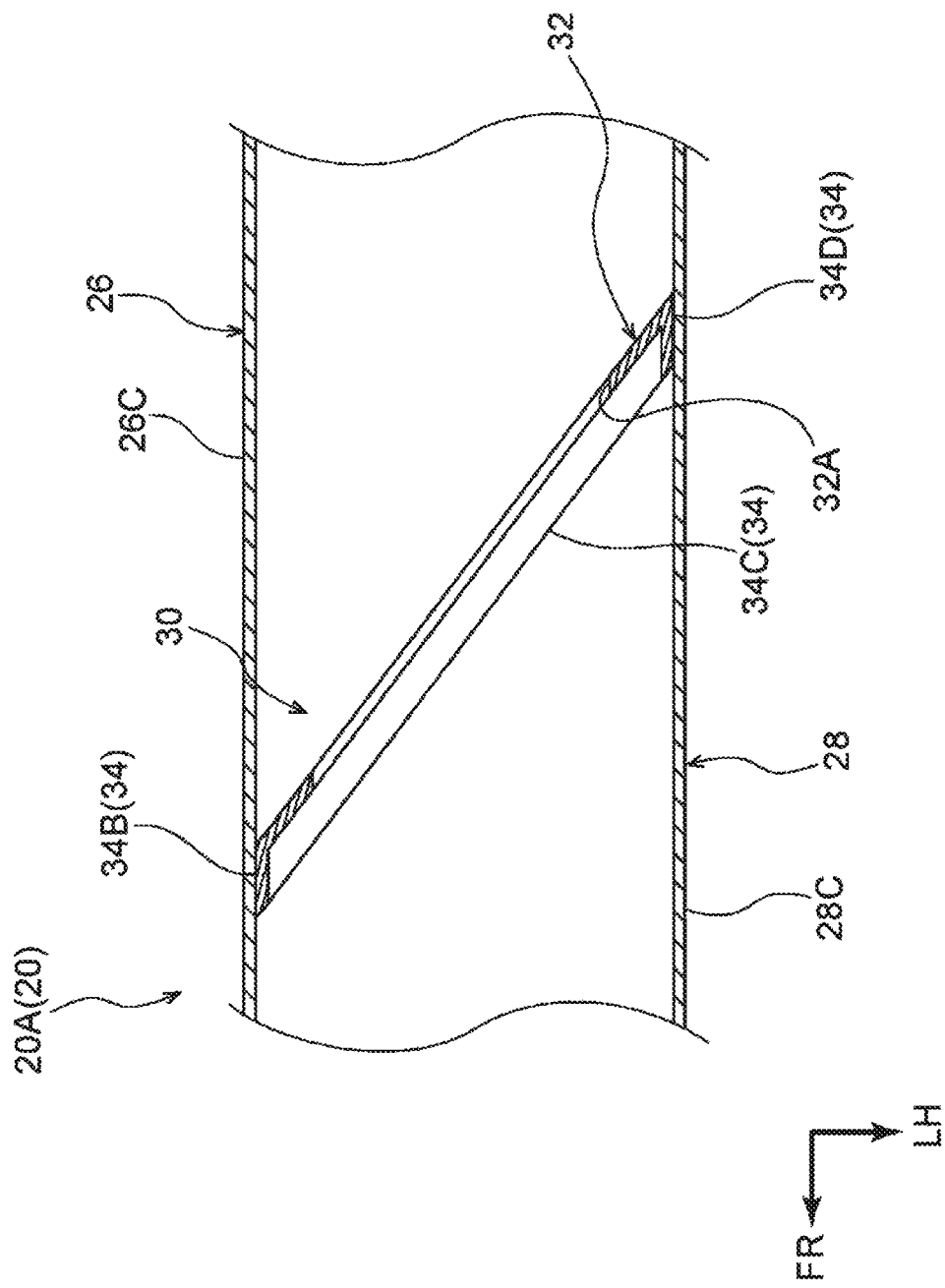
FIG. 4 is a sectional view taken along a line IV-IV in FIG. 3.

The bulk head 30 placed inside the closed section of the rocker 20 includes a body portion 32 and a flange portion 34. The body portion 32 is placed so as to be inclined from the vehicle front-rear direction and provided over the rocker inner panel 26 and the rocker outer panel 28. More specifically, as illustrated in FIG. 4, the body portion 32 is placed so as to be inclined toward the left side in the vehicle right-left direction (outwardly in the vehicle width direction) from the front side to the rear side in the vehicle front-rear direction in a plan sectional view. Further, the body portion 32 has a through-hole 32A having a generally elliptical shape for the purpose of drain off and weight reduction.

As illustrated in FIG. 2, the flange portion 34 extends from an outer peripheral edge of the body portion 32, and the flange portion 34 includes an upper flange 34A, an inner flange 34B, a lower flange 34C, and an outer flange 34D.

The upper flange 34A extends forward in the vehicle front-rear direction from an upper edge of the body portion 32, and the upper flange 34A is inclined, along the upper edge of the body portion 32, toward the left side in the vehicle right-left direction from the front side to the rear side in the vehicle front-rear direction in a plan view. A first welded portion W1 is set in the left side of the upper flange 34A in the vehicle right-left direction, and the upper flange 34A is welded to the rocker-outer-side upper wall portion 28B of the rocker outer panel 28 at the first welded portion W1 by spot welding or the like. Further, a second welded portion W2 is set in the right side of the upper flange 34A in the vehicle right-left direction, and the upper flange 34A is welded to the rocker-inner-side upper wall portion 26B of the rocker inner panel 26 at the second welded portion W2 by spot welding or the like.

The inner flange 34B extends downward in the vehicle up-down direction from a right end of the upper flange 34A in the vehicle right-left direction. The inner flange 34B extends forward in the vehicle front-rear direction from a right edge of the body portion 32 and is placed along the vehicle up-down direction. Further, a third welded portion W3 is set in the upper side of the inner flange 34B, and a fourth welded portion W4 is set in the lower side of the inner flange 34B. The inner flange 34B is welded to the rocker-inner-side vertical wall portion 26C of the rocker inner panel 26 at two parts, i.e., the third welded portion W3 and the fourth welded portion W4, by spot welding or the like.

The lower flange 34C extends toward the left side in the vehicle right-left direction from a lower end of the inner flange 34B. The lower flange 34C extends forward in the vehicle front-rear direction from a lower edge of the body portion 32 and is inclined, along the lower edge of the body portion 32, toward the left side in the vehicle right-left direction from the front side to the rear side in the vehicle front-rear direction in a plan view. That is, the lower flange 34C is placed generally in parallel with the upper flange 34A. A fifth welded portion W5 is set in the right side of the lower flange 34C in the vehicle right-left direction, and the lower flange 34C is welded to the rocker-inner-side lower wall portion 26D of the rocker inner panel 26 at the fifth welded portion W5 by spot welding or the like. Further, a sixth welded portion W6 is set in the left side of the lower flange 34C in the vehicle right-left direction, and the lower flange 34C is welded to the rocker-outer-side lower wall portion 28D of the rocker outer panel 28 at the sixth welded portion W6 by spot welding or the like.

The outer flange 34D extends upward in the vehicle up-down direction from a left end of the lower flange 34C in the vehicle right-left direction. The outer flange 34D extends forward in the vehicle front-rear direction from a left edge of the body portion 32 and is placed along the vehicle up-down direction. Further, a seventh welded portion W7 is set in the lower side of the outer flange 34D, and an eighth welded portion W8 is set in the upper side of the outer flange 34D. The outer flange 34D is welded to the rocker-outer-side vertical wall portion 28C of the rocker outer panel 28 at two parts, i.e., the seventh welded portion W7 and the eighth welded portion W8, by spot welding or the like. As described above, the upper flange 34A, the lower flange 34C, the inner flange 34B, and the outer flange 34D extend forward in the vehicle front-rear direction from the outer peripheral edge of the body portion 32, so as to be formed into a generally frame shape. On this account, respective edge lines are provided between the upper flange 34A and the inner flange 34B, between the inner flange 34B and the lower flange 34C, between the lower flange 34C and the outer flange 34D, and between the outer flange 34D and the upper flange 34A.

Figure 5:
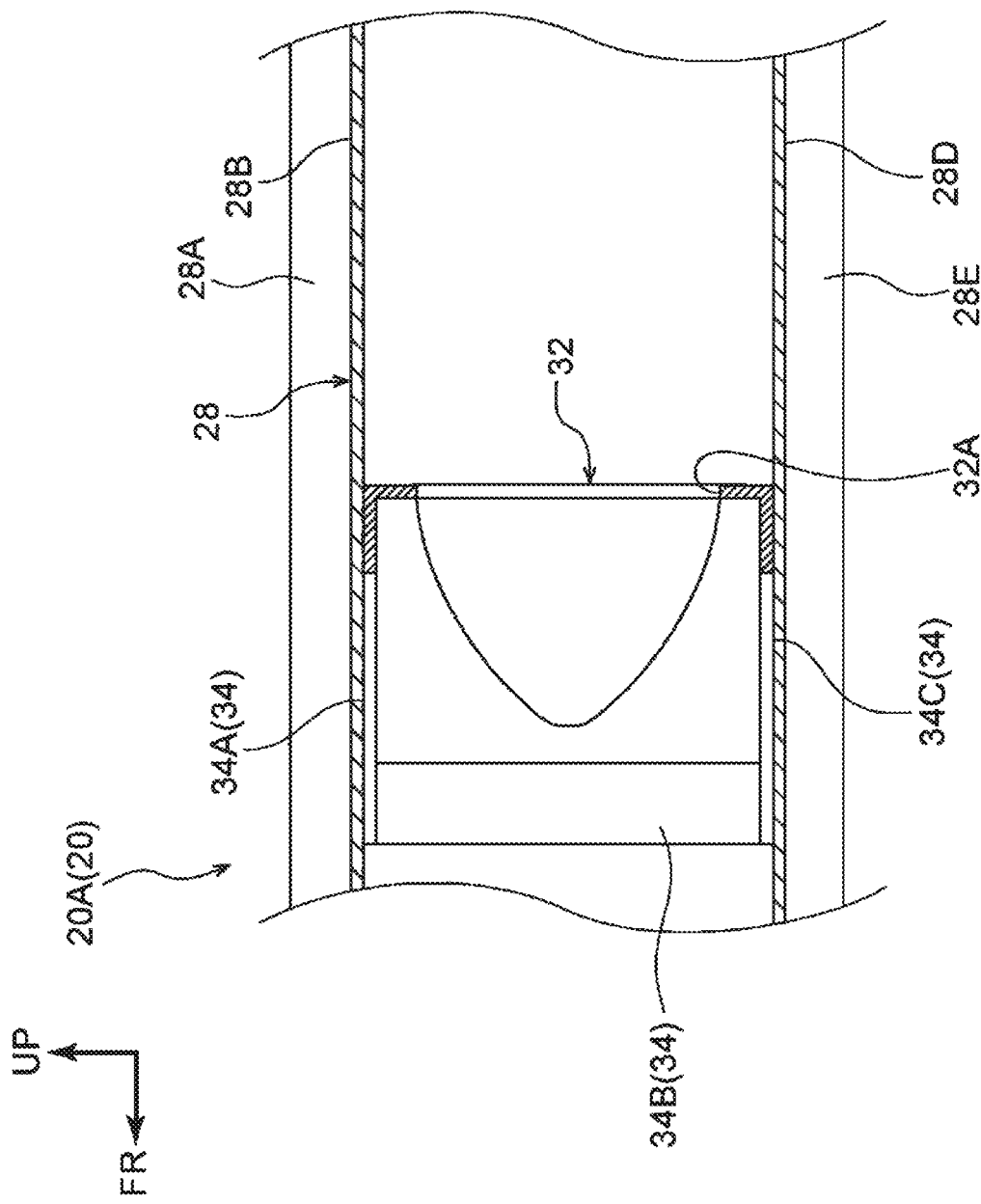
FIG. 5 is a sectional view taken along a line V-V in FIG. 3.

As illustrated in FIG. 5, a section of the body portion 32 of the bulk head 30 at the time when the body portion 32 is viewed from the vehicle width direction extends along the vehicle up-down direction. That is, the extending direction of the body portion 32 is a direction generally perpendicular to the vehicle front-rear direction that is the extending direction of the rocker 20. On this account, an upper end of the body portion 32 abuts with the rocker-outer-side upper wall portion 28B in a generally vertical manner, and a lower end of the body portion 32 abuts with the rocker-outer-side lower wall portion 28D in a generally vertical manner. Although not illustrated herein, the body portion 32 also abuts with the rocker-inner-side upper wall portion 26B and the rocker-inner-side lower wall portion 26D in a generally vertical manner, similarly to the above (see FIG. 3).

Operations and Effects

Next will be described operations and effects of the present embodiment.

As illustrated in FIG. 2, in the vehicle framework structure according to the present embodiment, the bulk head 30 is placed inside the closed section of the rocker 20, and the body portion 32 of the bulk head 30 is provided over the rocker inner panel 26 and the rocker outer panel 28. Further, the flange portion 34 extending from the outer peripheral edge of the body portion 32 is joined to the rocker inner panel 26 and the rocker outer panel 28. This makes it possible to increase the rigidity of the rocker 20 and to restrain sectional collapse of the rocker 20.

Further, in the present embodiment, as illustrated in FIG. 4, the body portion 32 of the bulk head 30 is placed so as to be inclined from the vehicle front-rear direction. That is, the body portion 32 is placed diagonally to the extending direction of the rocker 20. Hereby, it is possible to restrain sectional collapse of the rocker 20 in a wide range, in comparison with a configuration in which the bulk head 30 is placed in a direction perpendicular to the extending direction of the rocker 20. As a result, it is possible to reduce the number of bulk heads 30 to be placed inside the closed section of the rocker 20, thereby making it possible to restrain such a situation that the weight of the vehicle increases. That is, it is possible to secure NV performance while a weight reduction is achieved.

In terms of the above effect, when a plurality of bulk heads is placed in the direction (the vehicle width direction) perpendicular to the extending direction of the rocker 20 inside the closed section of the rocker 20, for example, vibration of the rocker 20 can be restrained in a wide range in the vehicle front-rear direction similarly to the present embodiment, but the number of bulk heads increases. This causes an increase in weight. In the meantime, when one bulk head is placed in the direction (the vehicle width direction) perpendicular to the extending direction of the rocker 20 and the thickness of the bulk head is increased, vibration of the rocker 20 can be restrained in a wide range similarly to the present embodiment, but the weight of the bulk head increases. In contrast, when the body portion 32 of the bulk head 30 is placed so as to be inclined from the vehicle front-rear direction like the present embodiment, it is possible to restrain sectional collapse of the rocker 20 in a wide range while a weight reduction is achieved.

Particularly, by providing respective bulk heads 30 in the part 20A of the rocker 20 between the front pillar 12 and the center pillar 14 and in the part 20B of the rocker 20 between the center pillar 14 and the rear pillar 16, the rigidity of the rocker 20 between pillars can be improved, thereby making it possible to restrain a decrease in NV performance caused due to vibration from the vehicle lower portion side.

Here, in the present embodiment, as illustrated in FIG. 3, the floor panel 36 is joined to the rocker inner panel 26 from the lower side in the vehicle up-down direction. On this account, when the rocker 20 vibrates in the vehicle up-down direction, the vibration in the vehicle up-down direction is transmitted to the floor panel 36. That is, the vibration in the vehicle up-down direction is easily input into the floor panel 36 from the rocker 20.

In the meantime, as illustrated in FIG. 5, the section of the body portion 32 of the bulk head 30 at the time when the body portion 32 is viewed from the vehicle width direction extends along the vehicle up-down direction. This makes it possible to effectively restrain sectional collapse of the rocker 20 in the up-down direction, and in the configuration where the floor panel 36 is joined to the rocker 20 from the lower side in the vehicle up-down direction, it is possible to effectively restrain vibration of the floor panel 36.

Further, in the present embodiment, the upper flange 34A, the lower flange 34C, the inner flange 34B, and the outer flange 34D are formed in succession into a generally frame shape, and the edge lines are provided between the flanges, respectively. Hereby, it is possible to further improve the rigidity in comparison with a configuration where the flanges are separated from each other.

Note that, in the present embodiment, as illustrated in FIG. 4, the body portion 32 of the bulk head 30 is placed so as to be inclined toward the left side in the vehicle right-left direction (outwardly in the vehicle width direction) from the front side to the rear side in the vehicle front-rear direction in a plan view, but the body portion 32 is not limited to this. That is, even in a case where the body portion 32 of the bulk head 30 is placed so as to be inclined toward the right side in the vehicle right-left direction (inwardly in the vehicle width direction) from the front side to the rear side in the vehicle front-rear direction in a plan view, it is also possible to obtain a similar effect.

Further, in the present embodiment, as illustrated in FIG. 2, the upper flange 34A, the lower flange 34C, the inner flange 34B, and the outer flange 34D are all joined to the rocker 20 by spot welding or the like. However, the disclosure is not limited to this, and a configuration of a modification illustrated in FIG. 6 may be employed.

Modification

Figure 6:
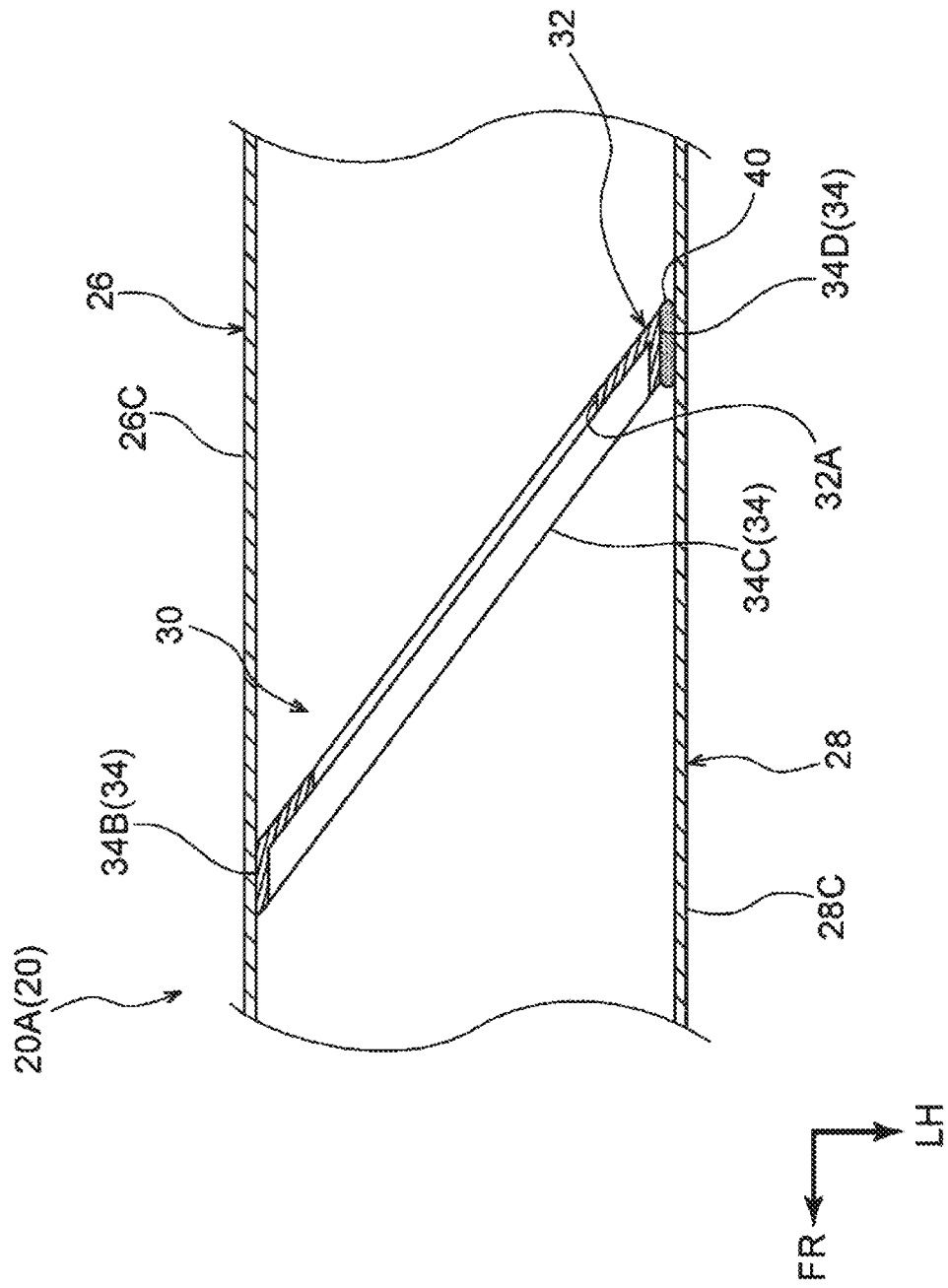
FIG. 6 is a sectional view corresponding to FIG. 4 and illustrating a modification of the vehicle framework structure according to the first embodiment.

As illustrated in FIG. 6, in the present modification, the inner flange 34B of the bulk head 30 is joined to the rocker-inner-side vertical wall portion 26C by spot welding, and the outer flange 34D of the bulk head 30 is joined to the rocker-outer-side vertical wall portion 28C via an adhesive 40.

Here, the following describes operations and effects of the present modification while the procedure of attaching the bulk head 30 in the present modification is described. First, in a state before the rocker inner panel 26 and the rocker outer panel 28 are joined to each other, the upper flange 34A, the inner flange 34B, and the lower flange 34C of the bulk head 30 are joined to the rocker inner panel 26 by spot welding.

At this time, the inner flange 34B of the bulk head 30 forms an obtuse angle with respect to the body portion 32, and therefore, it is possible to secure a wide working space for welding, so that a welding torch can be easily put therein. Further, since the upper flange 34A and the lower flange 34C are generally perpendicular to the body portion 32, an operation for welding is easily performable in comparison with a case where the inner flange 34B of the bulk head 30 is placed at an acute angle with respect to the body portion 32.

Then, the rocker inner panel 26 is joined to the rocker outer panel 28. At this time, the adhesive 40 is applied to an outer surface of the outer flange 34D of the bulk head 30 in advance. At the time when the rocker inner panel 26 is joined to the rocker outer panel 28, the outer flange 34D of the bulk head 30 is pressed against the rocker-outer-side vertical wall portion 28C, so that the outer flange 34D and the rocker-outer-side vertical wall portion 28C are joined to each other via the adhesive 40.

By joining the bulk head 30 to the rocker 20 in the above procedure, even if the outer flange 34D of the bulk head 30 forms an acute angle with respect to the body portion 32, it is not necessary to secure a working space for welding and it is possible to improve working efficiency at the time of welding the bulk head 30 to the rocker 20.

Note that the upper flange 34A and the lower flange 34C of the bulk head 30 may be joined to the rocker outer panel 28 via the adhesive 40 or by spot welding.

Further, in the present modification, the outer flange 34D of the bulk head 30 is joined to the rocker-outer-side vertical wall portion 28C via the adhesive 40. However, the disclosure is not limited to this, and the outer flange 34D may be joined to the rocker-outer-side vertical wall portion 28C by other methods. For example, the outer flange 34D may be joined to the rocker-outer-side vertical wall portion 28C with a bolt and a nut as a fastening member. In this case, bolt holes are formed in the outer flange 34D and the rocker-outer-side vertical wall portion 28C and a weld nut is provided on an inner surface side of the outer flange 34D. Hereby, it is possible to join the outer flange 34D to the rocker-outer-side vertical wall portion 28C in such a manner that the rocker inner panel 26 is joined to the rocker outer panel 28, and then, a bolt is inserted from outside the rocker-outer-side vertical wall portion 28C and screwed into the weld nut.

Further, in the present modification, the inner flange 34B side of the bulk head 30 forms an obtuse angle, and the outer flange 34D side forms an acute angle. However, the disclosure is not limited to this, and the disclosure is also applicable to a reverse case. That is, in a case where the body portion 32 of the bulk head 30 is placed so as to be inclined toward the right side in the vehicle right-left direction from the front side to the rear side in the vehicle front-rear direction in a plan view, the inner flange 34B side forms an acute angle, and the outer flange 34D side forms an obtuse angle. In this case, when the outer flange 34D is joined to the rocker-outer-side vertical wall portion 28C by spot welding and the inner flange 34B is joined to the rocker-inner-side vertical wall portion 26C via the adhesive 40, it is possible to obtain a similar effect.

Second Embodiment

Next will be described a vehicle framework structure according to the second embodiment with reference to FIGS. 7 to 10. Note that the same constituent as that of the first embodiment has the same reference sign as that of the first embodiment, and a description thereof is appropriately omitted.

Figure 7:
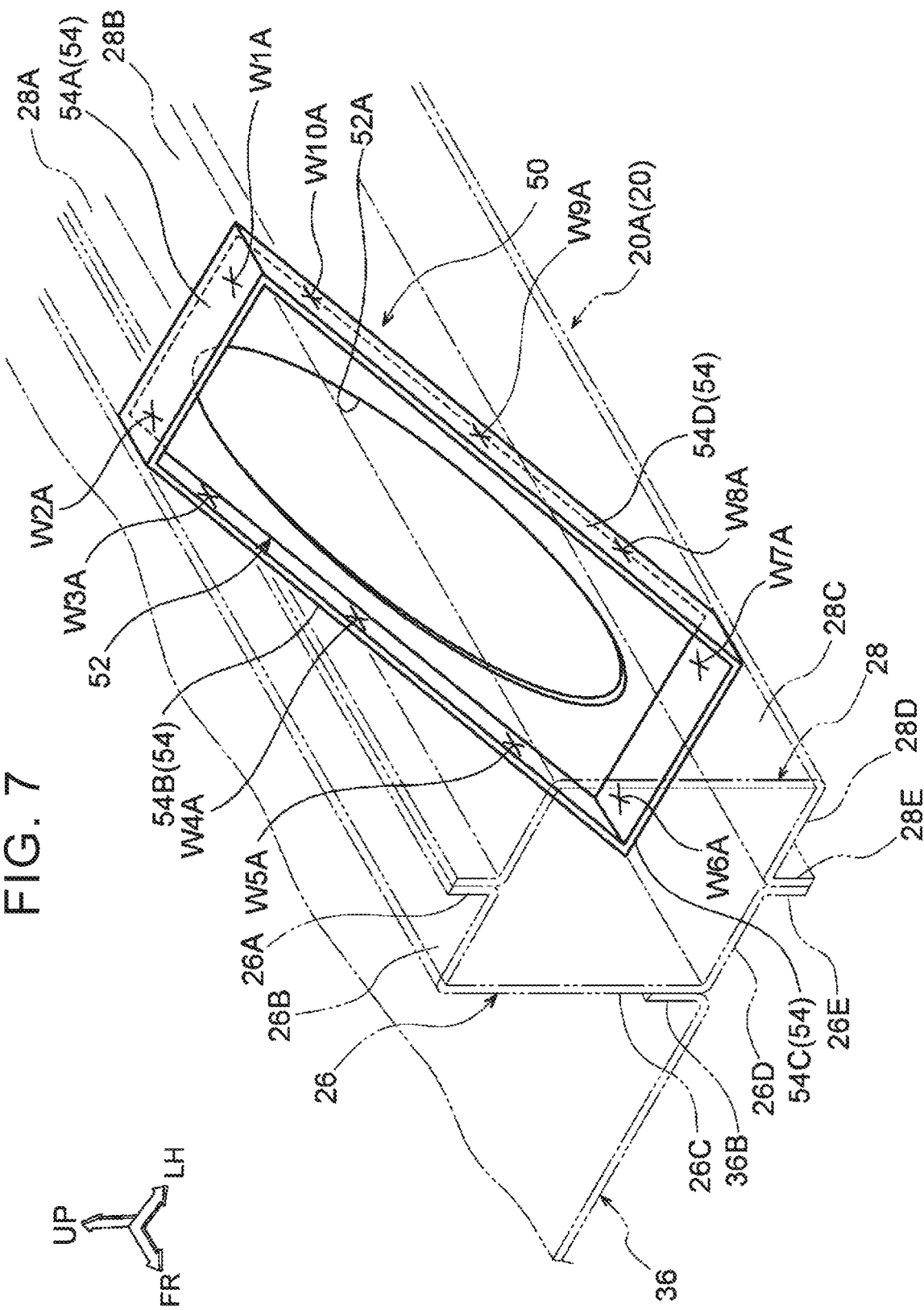
FIG. 7 is a perspective view of a rocker and a bulk head according to a second embodiment when they are viewed from the diagonally upper front side.
Figure 9:
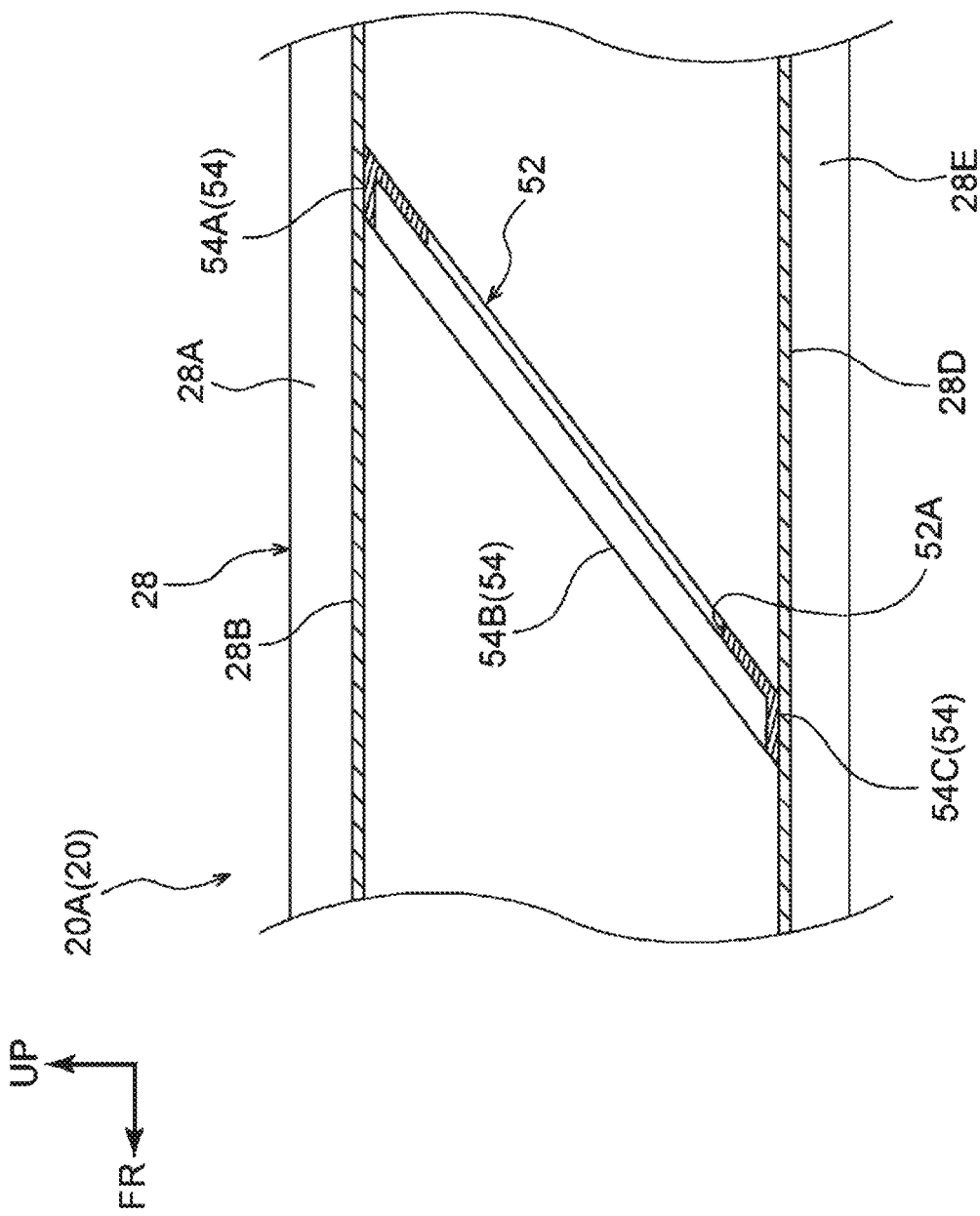
FIG. 9 is a sectional view taken along a line IX-IX in FIG. 8.

As illustrated in FIG. 7, in the present embodiment, a bulk head 50 as a reinforcing member is placed inside the closed section of the rocker 20, and the bulk head 50 includes a body portion 52 and a flange portion 54. The body portion 52 is placed so as to be inclined from the vehicle front-rear direction and provided over the rocker inner panel 26 and the rocker outer panel 28. More specifically, as illustrated in FIG. 9, the body portion 52 is placed so as to be inclined upward in the vehicle up-down direction from the front side to the rear side in the vehicle front-rear direction in a side view. Further, the body portion 52 has a through-hole 52A having a generally elliptical shape for the purpose of drain off and weight reduction.

As illustrated in FIG. 7, the flange portion 54 extends from an outer peripheral edge of the body portion 52, and the flange portion 54 includes an upper flange 54A, a lower flange 54C, an inner flange 54B, and an outer flange 54D.

The upper flange 54A extends forward in the vehicle front-rear direction from an upper edge of the body portion 52 and is placed along the vehicle width direction. Further, a first welded portion W1A is set in the left side of the upper flange 54A in the vehicle right-left direction, and the upper flange 54A is welded to the rocker-outer-side upper wall portion 28B of the rocker outer panel 28 at the first welded portion W1A by spot welding or the like. Further, a second welded portion W2A is set in the right side of the upper flange 54A in the vehicle right-left direction, and the upper flange 54A is welded to the rocker-inner-side upper wall portion 26B of the rocker inner panel 26 at the second welded portion W2A by spot welding or the like.

The inner flange 54B extends downward in the vehicle up-down direction from a right end of the upper flange 54A in the vehicle right-left direction. The inner flange 54B extends forward in the vehicle front-rear direction from a right edge of the body portion 52 and is inclined, along the right edge of the body portion 52, toward the upper side in the vehicle up-down direction from the front side to the rear side in the vehicle front-rear direction in a side view. Further, a third welded portion W3A is set in the upper side of the inner flange 54B, a fourth welded portion W4A is set in a central part of the inner flange 54B in the up-down direction, and a fifth welded portion W5A is set in the lower side of the inner flange 54B. The inner flange 54B is welded to the rocker-inner-side vertical wall portion 26C of the rocker inner panel 26 at three parts, i.e., the third welded portion W3A, the fourth welded portion W4A, and the fifth welded portion W5A, by spot welding or the like.

The lower flange 54C extends toward the left side in the vehicle right-left direction from a lower end of the inner flange 54B. The lower flange 54C extends forward in the vehicle front-rear direction from a lower ledge of the body portion 52 and is placed along the vehicle width direction. That is, the lower flange 54C is placed generally in parallel with the upper flange 54A. A sixth welded portion W6A is set in the right side of the lower flange 54C in the vehicle right-left direction, and the lower flange 54C is welded to the rocker-inner-side lower wall portion 26D of the rocker inner panel 26 at the sixth welded portion W6A by spot welding or the like. Further, a seventh welded portion W7A is set in the left side of the lower flange 54C in the vehicle right-left direction, and the lower flange 54C is welded to the rocker-outer-side lower wall portion 28D of the rocker outer panel 28 at the seventh welded portion W7A by spot welding or the like.

The outer flange 54D extends upward in the vehicle up-down direction from a left end of the lower flange 54C in the vehicle right-left direction. The outer flange 54D extends forward in the vehicle front-rear direction from a left edge of the body portion 52 and is inclined, along this left edge, toward the upper side in the vehicle up-down direction from the front side to the rear side in the vehicle front-rear direction in a side view. That is, the outer flange 54D is placed generally in parallel with the inner flange 54B. Further, an eighth welded portion W8A is set in the lower side of the outer flange 54D, a ninth welded portion W9A is set in a central part of the outer flange 54D in the up-down direction, and a tenth welded portion W10A is set in the upper side of the outer flange 54D. The outer flange 54D is welded to the rocker-outer-side vertical wall portion 28C of the rocker outer panel 28 at three parts, i.e., the eighth welded portion W8A, the ninth welded portion W9A, and the tenth welded portion W10A, by spot welding or the like. As described above, the upper flange 54A, the lower flange 54C, the inner flange 54B, and the outer flange 54D extend forward in the vehicle front-rear direction from the outer peripheral edge of the body portion 52, so as to be formed into a generally frame shape. On this account, respective edge lines are provided between the upper flange 54A and the inner flange 54B, between the inner flange 54B and the lower flange 54C, between the lower flange 54C and the outer flange 54D, and between the outer flange 54D and the upper flange 54A.

Figure 8:
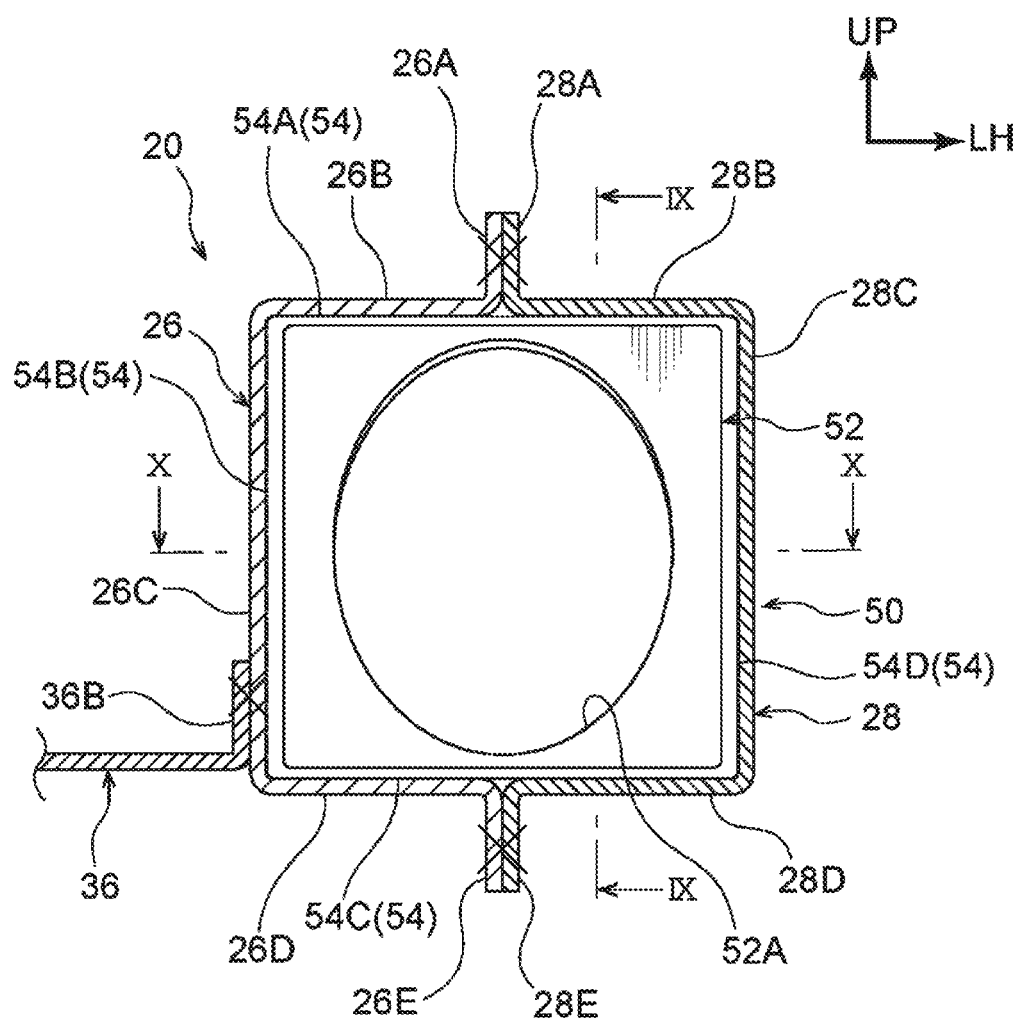
FIG. 8 is a sectional view of the rocker according to the second embodiment when it is viewed from the front side.

As illustrated in FIG. 8, the floor panel 36 is joined to the rocker 20. The floor panel 36 extends in the vehicle width direction and in the vehicle front-rear direction, and a bent portion 36B bent upward in the vehicle up-down direction is formed in a left end of the floor panel 36 in the vehicle right-left direction. In a state where the bent portion 36B overlaps with the rocker-inner-side vertical wall portion 26C of the rocker inner panel 26 from the right side in the vehicle right-left direction (from the inner side in the vehicle width direction), they are joined to each other by spot welding or the like.

Figure 10:
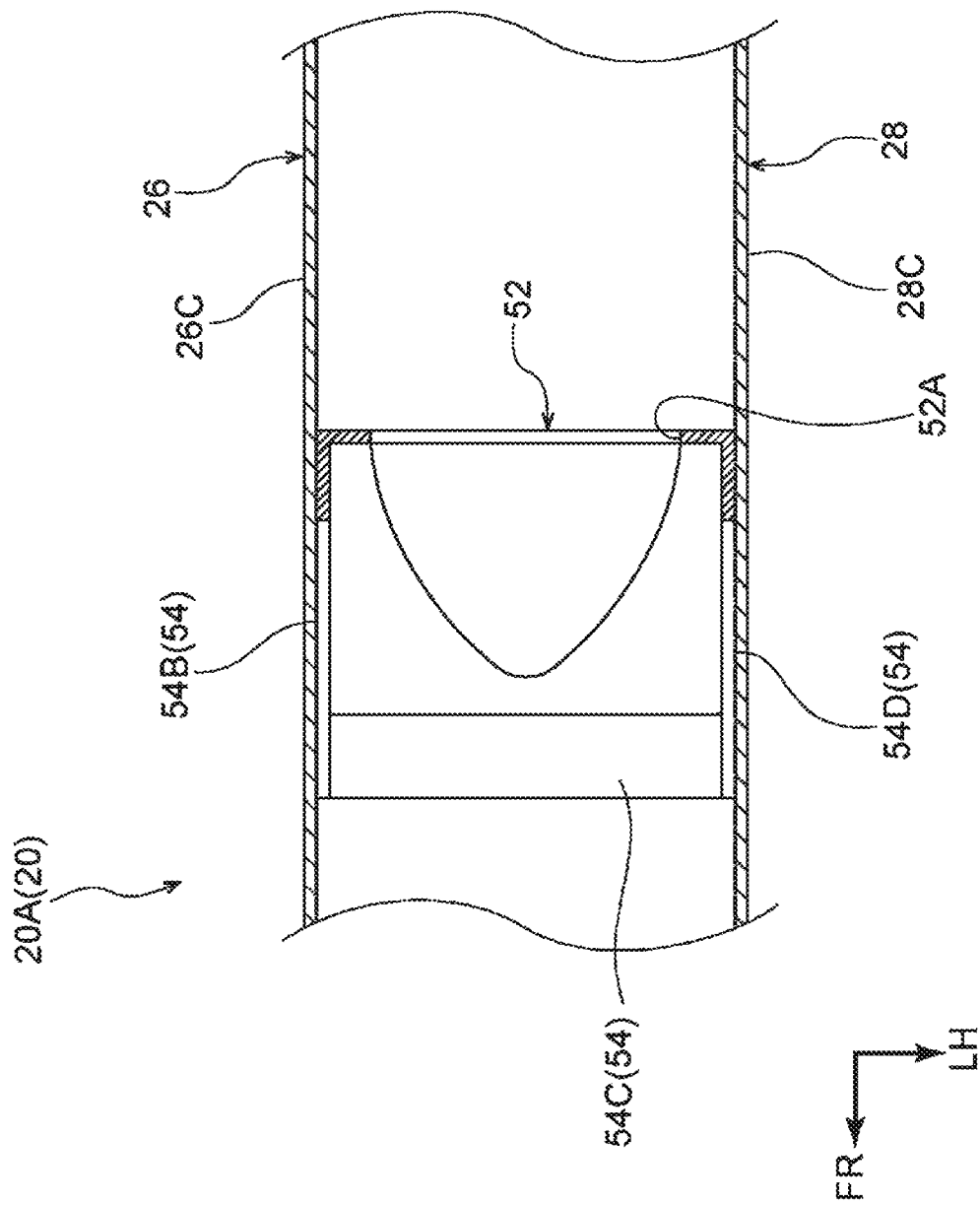
FIG. 10 is a sectional view taken along a line X-X in FIG. 8.
Figure 11:
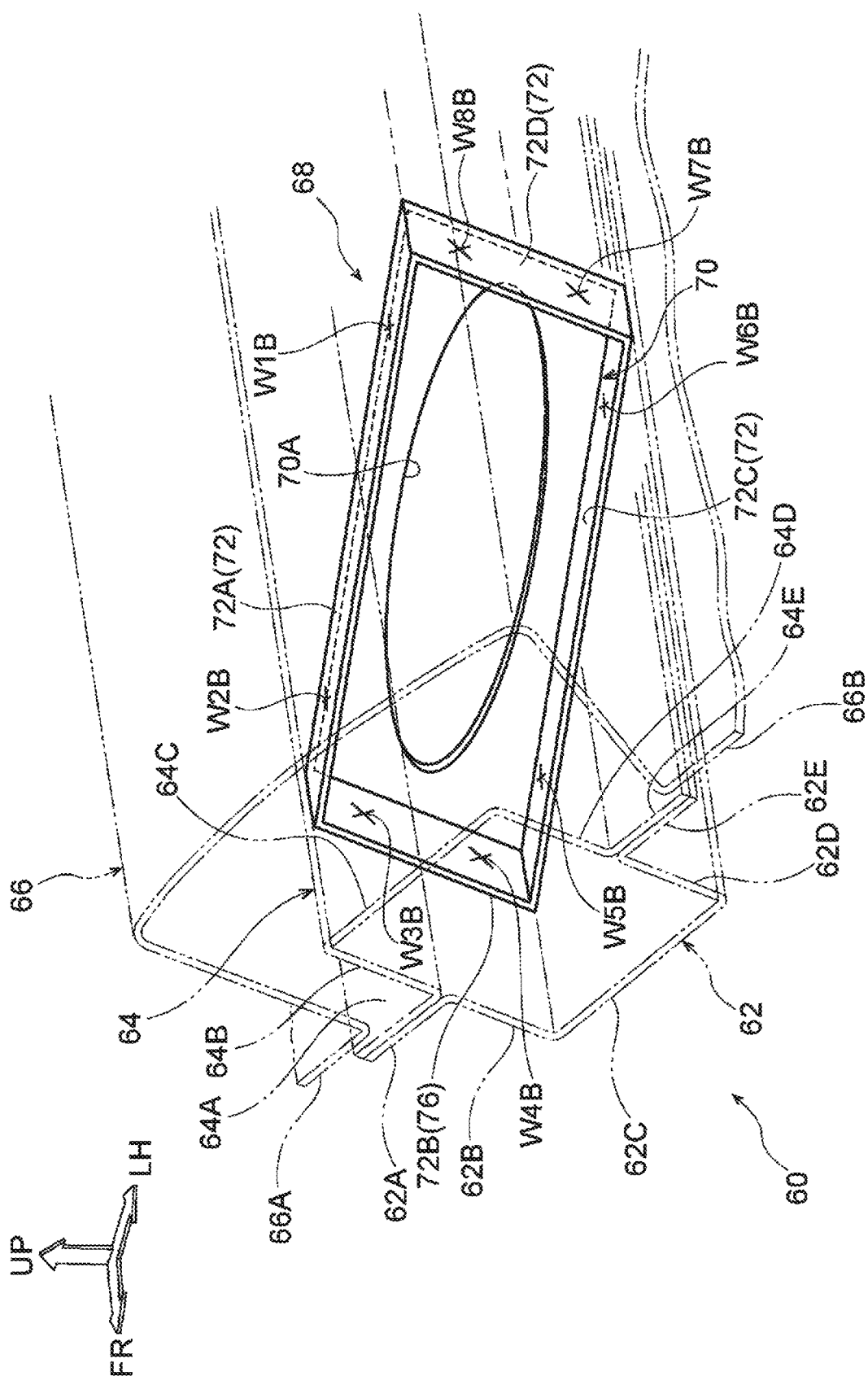
FIG. 11 is a perspective view of a roof side rail and a bulk head according to a third embodiment when they are viewed from the diagonally upper front side.

Here, as illustrated in FIG. 10, a section of the body portion 52 of the bulk head 50 at the time when the body portion 52 is viewed from the vehicle up-down direction extends along the vehicle width direction. That is, the extending direction of the body portion 52 is a direction generally perpendicular to the vehicle front-rear direction that is the extending direction of the rocker 20. On this account, a right end of the body portion 52 in the vehicle right-left direction abuts with the rocker-inner-side vertical wall portion 26C in a generally vertical manner, and a left end of the body portion 52 in the vehicle right-left direction abuts with the rocker-outer-side vertical wall portion 28C in a generally vertical manner.

Operations and Effects

Next will be described operations and effects of the present embodiment.

In the vehicle framework structure according to the present embodiment, the floor panel 36 is joined to the rocker inner panel 26 from the inner side in the vehicle width direction. Accordingly, when the rocker 20 vibrates in the vehicle width direction, the vibration in the vehicle width direction is transmitted to the floor panel 36. That is, the vibration in the vehicle width direction is easily input into the floor panel 36 from the rocker 20.

In the meantime, as illustrated in FIG. 10, the section of the body portion 52 of the bulk head 50 at the time when the body portion 52 is viewed from the vehicle up-down direction extends along the vehicle width direction. This makes it possible to effectively restrain sectional collapse of the rocker 20 in the vehicle width direction, and in the configuration where the floor panel 36 is joined to the rocker 20 from the inner side in the vehicle width direction, it is possible to effectively restrain vibration of the floor panel 36. Other effects are the same as those in the first embodiment.

Third Embodiment

Next will be described a vehicle framework structure according to the third embodiment.

The vehicle framework structure according to the present embodiment includes a roof side rail 60 as a framework body portion and a bulk head 68 as a reinforcing member, and the roof side rail 60 is provided in the vehicle upper portion so as to extend in the vehicle front-rear direction.

Further, in the roof side rail 60, a rail inner panel 62 on the inner side in the vehicle width direction and a rail outer panel 64 on the outer side in the vehicle width direction form a closed section, and the bulk head 68 is placed inside the closed section of the roof side rail 60.

The rail inner panel 62 is formed to have a generally hat-shaped section that is opened outward in the vehicle width direction and upward in the vehicle up-down direction, and a rail-inner-side upper flange 62A extending diagonally upward toward the right side is provided in an upper end of the rail inner panel 62. Further, a rail-inner-side upper wall portion 62B extends diagonally downward toward the right side from a lower end of the rail-inner-side upper flange 62A, and a rail-inner-side vertical wall portion 62C extends diagonally downward toward the left side from a right end of the rail-inner-side upper wall portion 62B. Further, a rail-inner-side lower wall portion 62D extends diagonally upward toward the left side from a lower end of the rail-inner-side vertical wall portion 62C, and a rail-inner-side lower flange 62E extends diagonally downward toward the left side from a left end of the rail-inner-side lower wall portion 62D.

In the meantime, the rail outer panel 64 is formed to have a generally hat-shaped section that is opened inward in the vehicle width direction and downward in the vehicle up-down direction, and a rail-outer-side upper flange 64A extending diagonally upward toward the right side is provided in an upper end of the rail outer panel 64. Further, a rail-outer-side upper wall portion 64B extends diagonally upward toward the left side from a lower end of the rail-outer-side upper flange 64A, and a rail-outer-side vertical wall portion 64C extends diagonally downward toward the left side from a left end of the rail-outer-side upper wall portion 64B in the vehicle right-left direction. Further, a rail-outer-side lower wall portion 64D extends diagonally downward toward the right side from a lower end of the rail-outer-side vertical wall portion 64C, and a rail-outer-side lower flange 64E extends diagonally downward toward the left side from a right end of the rail-outer-side lower wall portion 64D in the vehicle right-left direction. Thus, the closed section is formed by the rail inner panel 62 and the rail outer panel 64.

A side outer panel 66 is provided outwardly from the roof side rail 60 in the vehicle width direction. The side outer panel 66 includes a part swelling outward in the vehicle width direction and upward in the vehicle up-down direction so as to have a generally hat-shaped section, and a side-outer-side upper flange 66A extends diagonally upward toward the right side from an upper end of this part. In a state where the side-outer-side upper flange 66A overlaps with the rail-outer-side upper flange 64A and the rail-inner-side upper flange 62A, they are joined to each other by spot welding or the like.

Further, a side-outer-side lower flange 66B extending diagonally downward toward the left side is provided outwardly, in the vehicle width direction, from the rail-outer-side lower flange 64E of the side outer panel 66. In a state where the side-outer-side lower flange 66B overlaps with the rail-outer-side lower flange 64E and the rail-inner-side lower flange 62E, they are joined to each other by spot welding or the like.

The bulk head 68 placed inside the closed section of the roof side rail 60 includes a body portion 70 and a flange portion 72, and the body portion 70 is inclined from the vehicle front-rear direction and provided over the rail inner panel 62 and the rail outer panel 64. More specifically, the body portion 70 is placed so as to be inclined diagonally downward toward the left side, from the front side to the rear side in the vehicle front-rear direction. Further, the body portion 70 has a through-hole 70A having a generally elliptical shape for the purpose of drain off and weight reduction.

The flange portion 72 extends from an outer peripheral edge of the body portion 70, and the flange portion 72 includes an upper flange 72A, a lower flange 72C, an inner flange 72B, and an outer flange 72D.

The upper flange 72A extends forward in the vehicle front-rear direction from an upper edge of the body portion 70, and a first welded portion W1B and a second welded portion W2B are set in the upper flange 72A. The upper flange 72A is welded to the rail-outer-side upper wall portion 64B of the rail outer panel 64 at two parts, i.e., the first welded portion W1B and the second welded portion W2B.

Further, the inner flange 72B extends diagonally downward toward the right side from a right end of the upper flange 72A in the vehicle right-left direction, and a third welded portion W3B and a fourth welded portion W4B are set in the inner flange 72B. The third welded portion W3B is welded to the rail-outer-side upper wall portion 64B, and the fourth welded portion W4B is welded to the rail-inner-side upper wall portion 62B.

The lower flange 72C extends diagonally downward toward the left side from a lower end of the inner flange 72B, and a fifth welded portion W5B and a sixth welded portion W6B are set in the lower flange 72C. The lower flange 72C is welded to the rail-inner-side vertical wall portion 62C at two parts, i.e., the fifth welded portion W5B and the sixth welded portion W6B.

The outer flange 72D extends diagonally upward toward the left side from a left end of the lower flange 72C in the vehicle right-left direction, and a seventh welded portion W7B and an eighth welded portion W8B are set in the outer flange 72D. The seventh welded portion W7B is welded to the rail-inner-side lower wall portion 62D, and the eighth welded portion W8B is welded to the rail-outer-side lower wall portion 64D. As described above, the upper flange 72A, the lower flange 72C, the inner flange 72B, and the outer flange 72D extend forward in the vehicle front-rear direction from the outer peripheral edge of the body portion 70, so as to be formed into a generally frame shape.

Operations and Effects

Next will be described operations and effects of the present embodiment.

In the vehicle framework structure according to the present embodiment, the bulk head 68 is placed inside the closed section of the roof side rail 60, thereby making it possible to effectively restrain sectional collapse of the roof side rail 60. As a result, it is possible to restrain a decrease in NV performance caused due to vibration from the vehicle upper portion side.

The vehicle framework structures of the first to third embodiments of the disclosure have been described above, but it is needless to say that the disclosure may be performable in various aspects as long as the various aspects are not beyond the gist of the disclosure. For example, the bulk head 30 described in the first embodiment and the bulk head 50 described in the second embodiment may be placed side by side in the closed section of the rocker 20. In this case, it is possible to increase the rigidity with respect to both of the vibration of the rocker 20 in the vehicle up-down direction and the vibration of the rocker 20 in the vehicle width direction.

Further, in the above embodiments, the flange portion extends forward in the vehicle front-rear direction from the body portion of the bulk head. However, the disclosure is not limited to this, and the flange portion may extend rearward in the vehicle front-rear direction from the body portion. Further, a part of the flange portion may extend forward in the vehicle front-rear direction, and the rest of the flange portion may extend rearward in the vehicle front-rear direction. For example, in FIG. 4, when the inner flange 34B extends forward in the vehicle front-rear direction and the outer flange 34D extends rearward in the vehicle front-rear direction, those flanges form an obtuse angle with respect to the body portion 32. In this case, even if the inner flange 34B and the outer flange 34D are both joined by spot welding, it is possible to secure a working space for welding.

What is claimed is:

1. A vehicle framework structure, comprising:
   a framework body portion extending in a vehicle front-rear direction in a vehicle end portion in a vehicle width direction, the framework body portion comprising:
      a first panel, and
      a second panel,
      wherein opposite sides of the first panel are joined to corresponding opposite sides of the second panel to form a closed section which is surrounded by the first panel and the second panel; and
   a reinforcing member placed inside the closed section of the framework body portion to be surrounded by the first panel and the second panel, the reinforcing member including:
      a body portion which, in a top plan view in a vehicle up-down direction, extends from an inner side of the framework body portion in the vehicle width direction to an outer side of the framework body portion in the vehicle width direction, while being inclined from both the vehicle front-rear direction and the vehicle width direction, and
      a flange portion extending from an outer peripheral edge of the body portion and joined to the framework body portion at the inner side and the outer side of the framework body portion.

2. The vehicle framework structure according to claim 1, wherein
   the framework body portion is a rocker extending in the vehicle front-rear direction in a vehicle lower portion.

3. The vehicle framework structure according to claim 2, wherein:
   one end of a floor panel in the vehicle width direction is joined to the first panel from a lower side in the vehicle up-down direction;
   the body portion of the reinforcing member is placed so as to be inclined outwardly in the vehicle width direction or inwardly in the vehicle width direction from a front side to a rear side in the vehicle front-rear direction in the top plan view; and
   a section of the body portion viewed from the vehicle width direction extends along the vehicle up-down direction.

4. The vehicle framework structure according to claim 3, wherein:
   the flange portion includes an inner flange placed on an inner side of the body portion in the vehicle width direction, and an outer flange placed on an outer side of the body portion in the vehicle width direction;
   either one of the inner flange and the outer flange forms an obtuse angle with respect to the body portion and is joined to the framework body portion by welding; and
   the other one of the inner flange and the outer flange forms an acute angle with respect to the body portion and is joined to the framework body portion mechanically with an adhesive or a fastening member.

5. The vehicle framework structure according to claim 1, wherein
   the reinforcing member is placed at least between a front pillar and a center pillar or between the center pillar and a rear pillar.

6. The vehicle framework structure according to claim 1, wherein
   the framework body portion is a roof side rail provided in a vehicle upper portion so as to extend in the vehicle front-rear direction.

7. A vehicle framework structure, comprising:
   a framework body portion extending in a vehicle front-rear direction in a vehicle end portion in a vehicle width direction, the framework body portion comprising:
      a first panel, and
      a second panel,
      wherein opposite sides of the first panel are joined to corresponding opposite sides of the second panel to form a closed section; and
   a reinforcing member placed inside the closed section of the framework body portion, the reinforcing member including:
      a body portion inclined from the vehicle front-rear direction and provided over the first panel and the second panel, and
      a flange portion extending from an outer peripheral edge of the body portion, wherein
      the flange portion includes an inner flange on an inner side of the body portion in the vehicle width direction, and an outer flange on an outer side of the body portion in the vehicle width direction,
      either one of the inner flange and the outer flange forms an obtuse angle with respect to the body portion and is joined to the framework body portion, and
      the other one of the inner flange and the outer flange forms an acute angle with respect to the body portion and is joined to the framework body portion.

8. A vehicle framework structure, comprising:
a framework body portion extending in a vehicle front-rear direction in a vehicle end portion in a vehicle width direction, the framework body portion comprising:
a first panel, and
a second panel,
wherein opposite sides of the first panel are joined to corresponding opposite sides of the second panel to form a closed section; and
a reinforcing member placed inside the closed section of the framework body portion, the reinforcing member including:
a body portion inclined from the vehicle front-rear direction and provided over the first panel and the second panel, and
a flange portion extending from an outer peripheral edge of the body portion, wherein
the flange portion includes a lower flange on a lower side of the body portion in a vehicle up-down direction, and an upper flange on an upper side of the body portion in the vehicle up-down direction,
either one of the lower flange and the upper flange forms an obtuse angle with respect to the body portion and is joined to the framework body portion, and
the other one of the lower flange and the upper flange forms an acute angle with respect to the body portion and is joined to the framework body portion.

* * * * *